United States Patent Office 3,150,130
Patented Sept. 22, 1964

3,150,130
PREPARATION OF AMINODITHIOTHIAZOLES
Albert F. Hardman, Akron, Ohio, assignor to The Goodyear Tire & Rubber Company, Akron, Ohio, a corporation of Ohio
No Drawing. Filed July 31, 1962, Ser. No. 213,670
6 Claims. (Cl. 260—247.1)

This invention relates to aminodithiothiazoles and to a method of making these materials.

Aminodithiazoles are powerful accelerators of vulcanization of rubber. They can be used to promote the curing of rubber with or without sulfur and are particularly useful in black tread stocks and other compositions containing rubber in which a powerful, yet delayed action, non-scorching accelerator is needed to promote the curing of the rubber composition.

The compounds with which this invention is particularly concerned are secondary aminodithiothiazoles which can be represented by the general structural formula

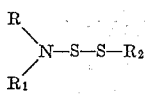

in which R and $R_1$ are the same or different aliphatic, cycloaliphatic, or aralkyl groups, or R and $R_1$ together form a single chain and $R_2$ is an azole selected from the group consisting of 2-thiazoles and 2-aryl thiazoles.

According to the invention, the aminodithiothiazoles are prepared by reacting a 2,2'-bis-thiazoledisulfide with a secondary amine and sulfur in the presence of an inorganic alkaline material.

The reaction appears to proceed according to the following equation in which 2,2'-bis-benzothiazole disulfide and morpholine are used as representative starting materials to react with sulfur:

Various other aminodithiothiazoles can be prepared by using other 2,2'-bis-thiazole disulfides and other secondary amines in the place of the materials used in the example. Representative examples are 2,2'-bis-thiazole disulfide;
2,2'-bis-4-methyl-thiazoledisulfide;
2,2'-bis-4-ethyl-thiazoledisulfide;
2,2'-bis-4-n-propyl-thiazoledisulfide;
2,2'-bis-4-n-butyl-thiazoledisulfide;
2,2'-bis-4,5-dimethyl-thiazoledisulfide;
2,2'-bis-4,5-diethyl-thiazoledisulfide;
2,2'-bis-4,5-di-n-propyl-thiazoledisulfide;
2,2'-bis-4,5-di-n-butyl-thiazoledisulfide;
2,2'-bis-4-phenyl-thiazoledisulfide;
2,2'-bis-4-phenyl-5-methyl-thiazoledisulfide;
2,2'-bis-4-phenyl-benzothiazoledisulfide;
2,2'-bis-6-phenyl-benzothiazoledisulfide;
2,2'-bis-tetrahydrobenzothiazoledisulfide; and
2,2'-bis-naphtho-thiazoledisulfide.

The 2,2'-bis-benzothiazoledisulfide is the preferred species. The amines which can be used in this invention are aliphatic, cycloaliphatic and aralkyl secondary amines. Representative examples of such amines are: dimethylamine, diethylamine, di-n-propylamine, diisopropylamine, dibutylamine, dicyclohexylamine, methylethylamine, methylpropylamine, methylisopropylamine, ethylpropylamine, ethylbutylamine, methylcyclohexylamine, morpholine, thiomorpholine, and piperidine.

The illustrative example shows the reaction of the thiazole disulfide, the amine and sulfur being carried out in the presence of sodium carbonate. Sodium carbonate is not an essential ingredient in carrying out the foregoing reaction but it has been found that the presence of an inorganic alkaline material and particularly those selected from the carbonates, bicarbonates and hydroxides of the alkali metals causes the reactants to

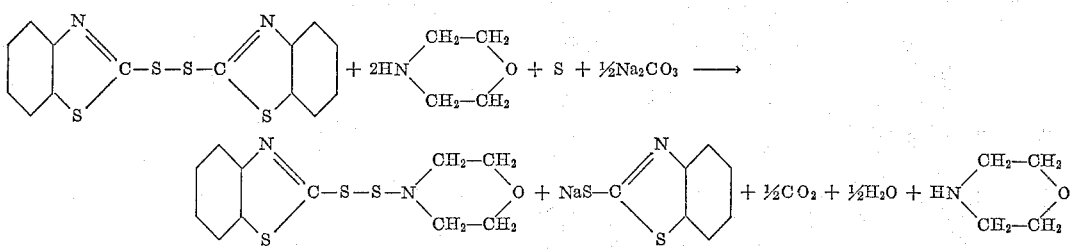

The practice of the invention is illustrated by the following representative example:

Thirty-four grams of 2,2'-bis-benzothiazole disulfide, 3.5 grams of sulfur, 18 grams of morpholine and 100 milliliters of methanol were placed in a small three-neck flask set up with a stirrer and reflux condenser. The mixture was stirred and heated under refluxing conditions. After 1½ hours of reaction time no crystals of the desired product had formed, whereupon 6 grams of sodium carbonate were added to the reaction mixture. The mixture effervesced and in 10 minutes began thickening with crystals. After one hour the mixture was cooled, filtered, and washed with methanol and with water. A yield of 24.5 grams of product having a melting point of 133–134° C. was obtained, this represents a yield which is 97% of theoretical.

From a consideration of the above example it will be apparent that even though there was a substantial excess of morpholine employed the reaction between the disulfide, morpholine and sulfur did not proceed to a satisfactory degree of completion in 1½ hours but that a very high yield of the desired aminodithiothiazole was obtained within a relatively short time after the introduction of sodium carbonate to the reaction mixture.

inter-react at a faster rate and gives improved yields of product. Representative examples of suitable inorganic alkaline materials which may be used to catalyze the reaction between thiazole disulfides, secondary amines and sulfur are sodium carbonate, sodium bicarbonate, sodium hydroxide, potassium carbonate, potassium bicarbonate and potassium hydroxide.

In preparing aminodithiothiazoles by the above disclosed process best results are obtained when the reaction is conducted in a suitable organic solvent. However, the reaction will proceed at reasonable rates to give a satisfactory yield of aminodithiothiazole without employing solvents. Solvents which have been found to be suitable for use in this process are the customary organic solvents such as the lower aliphatic alcohols. Representative examples of suitable solvents are methanol, ethanol, isopropanol, normal propanol, normal butanol and other solvents such as benzene, toluene, and xylene.

The reaction of the example was carried out at refluxing temperature. Higher or lower temperatures can be used. The temperature is not critical, but it is desirable to use a temperature which will give reasonably fast reaction rates so that the process can be economically carried out.

This application is a continuation-in-part of application Serial No. 716,538, filed February 12, 1958 and now abandoned.

While certain representative embodiments and details have been shown for the purpose of illustrating the invention it will be apparent to those skilled in the art that various changes and modifications may be made therein without departing from the spirit or scope of the invention.

I claim:

1. In the process of preparing an aminodithiothiazole which comprises reacting a 2,2'-bis-thiazole disulfide with a secondary amine and sulfur, the improvement wherein the reaction is conducted in the presence of an inorganic alkaline material selected from the group consisting of the carbonates, bicarbonates and hydroxides of the alkali metals.

2. In the process of preparing an aminodithiothiazole which comprises reacting in an organic solvent a 2,2'-bis-thiazole disulfide with a secondary amine and sulfur, the improvement wherein the reaction is conducted in the presence of an inorganic alkaline material selected from the group consisting of the carbonates, bicarbonates and hydroxides of the alkali metals.

3. In the process of preparing a 2-(amino dithio) benzothiazole which comprises reacting a 2,2'-bis-benzothiazole disulfide with a secondary amine and sulfur, the improvement wherein the reaction is conducted in the presence of an inorganic alkali material selected from the group consisting of the carbonates, bicarbonates and hydroxides of the alkali metals.

4. In the process of preparing a 2-(amino dithio) benzothiazole which comprises reacting a 2,2'-benzothiazole disulfide with a secondary amine and sulfur, the improvement wherein the reaction is conducted in the presence of an alkaline material selected from the group consisting of sodium carbonate, sodium bicarbonate, sodium hydroxide, potassium carbonate, potassium bicarbonate, and potassium hydroxide.

5. In the process of preparing 2-(4-morpholinyldithio) benzothiazole which comprises reacting 2,2'-bis-benzothiazole disulfide with morpholine and sulfur, the improvement wherein the reaction is conducted in the presence of an alkaline material selected from the group consisting of sodium carbonate, sodium bicarbonate, sodium hydroxide, potassium carbonate, potassium bicarbonate, and potassium hydroxide.

6. In the process of preparing 2-(4-morpholinyldithio) benzothiazole which comprises reacting 2,2'-bis-benzothiazole disulfide with morpholine and sulfur, the improvement wherein the reaction is conducted in the presence of sodium carbonate.

References Cited in the file of this patent

UNITED STATES PATENTS 2,837,519    Hardman _____ June 3, 1958